United States Patent
Roitberg et al.

(10) Patent No.: US 8,641,292 B2
(45) Date of Patent: Feb. 4, 2014

(54) PHOTONIC ASSEMBLY FOR OPTICAL FIBERS

(75) Inventors: Lee Jacobo Jose Roitberg, Austin, TX (US); Edmund J. Haley, Dillsburg, PA (US)

(73) Assignee: Tyco Electronics Corporation, Berwyn, PA (US)

(*) Notice: Subject to any disclaimer, the term of this patent is extended or adjusted under 35 U.S.C. 154(b) by 290 days.

(21) Appl. No.: 13/183,141

(22) Filed: Jul. 14, 2011

(65) Prior Publication Data

US 2013/0016947 A1   Jan. 17, 2013

(51) Int. Cl.
*G02B 6/38* (2006.01)
*G02B 6/36* (2006.01)

(52) U.S. Cl.
USPC ............... 385/59; 385/53; 385/55; 385/56; 385/60; 385/63

(58) Field of Classification Search
USPC .......................................................... 385/14
See application file for complete search history.

(56) References Cited

U.S. PATENT DOCUMENTS

| | | | |
|---|---|---|---|
| 5,499,311 A * | 3/1996 | DeCusatis | 385/89 |
| 6,364,536 B1 * | 4/2002 | Chen et al. | 385/59 |
| 6,406,192 B1 * | 6/2002 | Chen et al. | 385/56 |
| 6,450,698 B1 * | 9/2002 | Chen et al. | 385/88 |
| 6,461,053 B1 * | 10/2002 | Mayercik et al. | 385/56 |
| 6,592,268 B2 * | 7/2003 | Chen et al. | 385/88 |
| 7,168,978 B1 | 1/2007 | Trout et al. | |
| 7,267,568 B2 * | 9/2007 | Baker | 439/247 |
| 7,553,091 B2 | 6/2009 | McColloch | |
| 7,963,704 B2 * | 6/2011 | Andrei et al. | 385/69 |
| 2002/0181883 A1 * | 12/2002 | Harris et al. | 385/53 |
| 2003/0171029 A1 * | 9/2003 | Yamada et al. | 439/553 |
| 2009/0279832 A1 * | 11/2009 | Andrei et al. | 385/69 |
| 2010/0165983 A1 * | 7/2010 | Aybay et al. | 370/388 |
| 2013/0016947 A1 * | 1/2013 | Roitberg et al. | 385/60 |

* cited by examiner

*Primary Examiner* — Rhonda Peace (57) ABSTRACT

A photonic assembly includes a midplane connector having connector channels extending therethrough. Fiber optic connectors are positioned within the connector channels of the midplane connector. The fiber optic connectors retain ferrules of midplane optical fibers and aligning the ferrules of the midplane optical fibers within the midplane connector. A midplane substrate is provided having an opening extending therethrough. The midplane connector is positioned within the opening of the midplane substrate. The midplane connector floats within the opening of the midplane substrate to position the ferrules of the midplane optical fibers.

20 Claims, 3 Drawing Sheets

PHOTONIC ASSEMBLY FOR OPTICAL FIBERS

BACKGROUND OF THE INVENTION

The subject matter described herein relates generally to an photonic assembly for optical fibers.

Electronic devices, such as switches, are used to interconnect many data transmission lines at a common location, such as a switch box. Such systems generally include a plurality of circuit boards that are coupled using electrical connectors or photonic connectors connected to the circuit boards. For example, backplanes and daughtercards are typically connected in this manner. Some systems utilize a midplane connector to connect line cards and switch cards.

Systems utilizing fiber optic connections have several disadvantages. For example, connecting many fiber optic connectors together at once has proven difficult. For example, when mating line cards and switch cards, the line cards and switch cards need to both be aligned with connectors held by a midplane. Plugging multiple connectors in at once is difficult due to manufacturing tolerances. When the optical fibers are joined, the ferrules must be precisely aligned along the same axis to provide optimal signal transmission between the optical fibers. In many electronic devices, the optical fibers may become misaligned so that the ferrules of the fibers do not extend along the same axis. Moreover, the optical fibers may become bent, thereby further misaligning the optical fibers. In some electronic devices, the ferrules may become separated forming a gap between the optical fibers. Misalignment of the optical fibers and/or gaps between the optical fibers may result in faulty signal transmissions between the optical fibers. Faulty signal transmissions may affect the performance of the electronic device and/or result in damage to the electronic device. Additionally, systems that use midplanes are not flexible in design and require redesign of the entire cabinet to obtain different switching configurations.

A need remains for a photonic assembly for optical fibers that provides a flexible approach to connecting fiber optic connectors. A need remains for a mechanism that properly aligns optical fibers and prevents gaps between the optical fibers.

SUMMARY OF THE INVENTION

In one embodiment, a photonic assembly for optical fibers is provided. The photonic assembly includes a midplane connector having connector channels extending therethrough. Fiber optic connectors are positioned within the connector channels of the midplane connector. The fiber optic connectors retain ferrules of midplane optical fibers and align the ferrules of the midplane optical fibers within the midplane connector. A midplane substrate is provided having an opening extending therethrough. The midplane connector is positioned within the opening of the midplane substrate. The midplane connector floats within the opening of the midplane substrate to position the ferrules of the midplane optical fibers.

In another embodiment, a photonic assembly for optical fibers is provided. The photonic assembly includes a midplane connector coupled to a midplane substrate. The midplane connector has connector channels formed therein to receive midplane optical fibers. The midplane connector is enabled to float with respect to the midplane substrate. A header connector is coupled to a header substrate. The header connector has connector channels formed therein to receive header optical fibers. The header connector is coupled to the midplane connector to couple the midplane substrate and the header substrate. The midplane connector floats with respect to the midplane substrate to align the midplane connector and the header connector.

In another embodiment, a photonic assembly is provided. The photonic assembly includes a midplane assembly having a first midplane substrate and a second midplane substrate parallel and spaced apart from the first midplane substrate. A first midplane connector is coupled to the first midplane substrate so that the first midplane connector faces in a first direction for mating with a first header connector. A second midplane connector is coupled to the second midplane substrate so that the second midplane connector faces in a second direction opposite the first direction for mating with a second header connector. The photonic assembly includes a plurality of midplane optical fiber assemblies each having a first fiber optic connector terminated to a first end of a fiber optic cable and a second fiber optic connector terminated to a second end of a fiber optic cable. The fiber optic cable spans between the first and second midplane substrates.

DETAILED DESCRIPTION OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
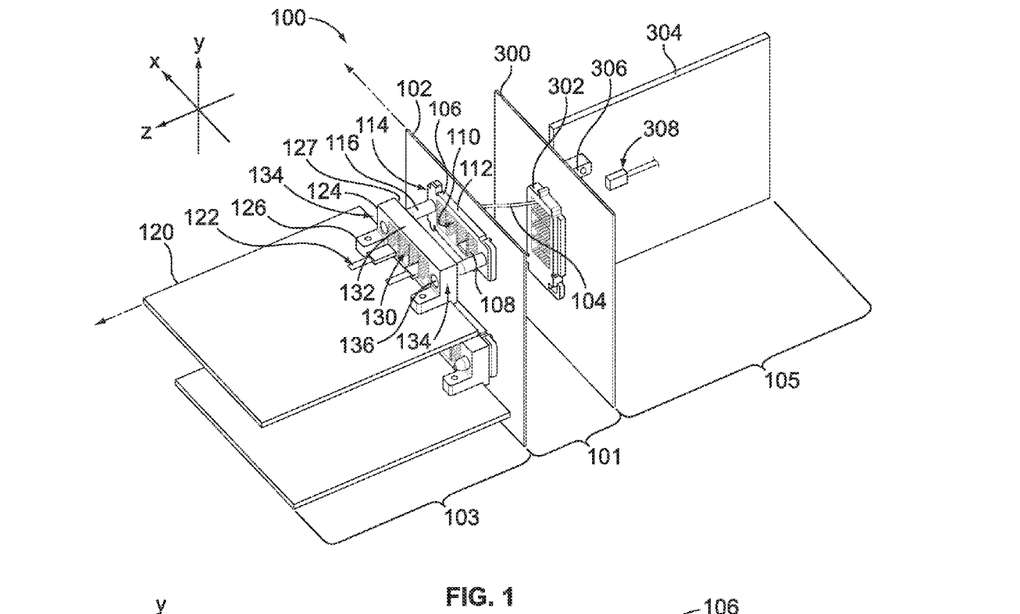
FIG. 1 is a top perspective view of a photonic assembly formed in accordance with an embodiment.

FIG. 1 illustrates a photonic assembly 100 formed in accordance with an embodiment. The photonic assembly 100 includes a midplane assembly 101 used to interconnect a first header assembly 103 and a second header assembly 105. In an exemplary embodiment, the midplane assembly 101 and header assemblies 103, 105 are fiber optic assemblies transmitting fiber optic signals. The midplane assembly 101 is modular in design. The midplane assembly 101 allows flexibility in mating arrangements of the header assemblies 103, 105. In an exemplary embedment, the midplane assembly 101 includes features adapted for blind mating of the header assemblies 103, 105 to ease assembly.

The midplane assembly 101 includes a first midplane substrate 102 and a second midplane substrate 300. In the illustrated embodiment, the first midplane substrate 102 and the second midplane substrate 300 are parallel and spaced apart.

In the illustrated embodiment, the first midplane substrate 102 and the second midplane substrate 300 are panels, such as metal walls, that are held within a chassis or frame. Alternatively, the first and second midplane substrates 102, 300 may be circuit boards, for example, printed circuit boards, flex circuits, or the like.

The midplane assembly 101 includes midplane fiber optic assemblies 104 (only one of which is illustrated in FIG. 1) that extend between the first midplane substrate 102 and the second midplane substrate 300. The midplane fiber optic assemblies 104 are cable assemblies that convey fiber optic transmissions between fiber optic connectors 200 (shown in FIG. 6) at opposite ends of fiber optic cables 201. Optionally, a plurality of individual optical fibers are bundled together to define the fiber optic cable 201. Each end of the optical fibers includes a fiber optical ferrule 216 (shown in FIG. 6) that is configured to be mated with a complementary fiber optic ferrule 216 of the corresponding header assembly 103, 105.

The midplane assembly 101 includes a midplane connector 106 mounted to the midplane substrate 102. The midplane connector 106 is coupled within an opening 166 (shown in FIG. 6) formed in the midplane substrate 102. In an exemplary embodiment, the midplane connector 106 is not rigidly fixed to the midplane substrate 102, but rather is allowed to move with respect to the midplane substrate 102. For example, the midplane connector 106 is configured to float in at least one of the x, y, and z directions within the opening 166. The floating allows the midplane connector 106 to be properly positioned during mating with the header assembly 101. The floating aides in blind mating the header assembly 101 with the midplane assembly 101. The floating makes up for manufacturing tolerances in the midplane assembly 101 and/or the header assembly 101. The midplane connector 106 includes a mating surface 108. In the illustrated embodiment, the mating surface 108 is oriented substantially parallel to a plane formed by the midplane substrate 102. Alternatively, the mating surface 108 may extend substantially perpendicular to the midplane substrate 102 or at any other suitable angle.

The midplane connector 106 includes connector channels 110 formed therein. The connector channels 110 are configured to receive a plurality of the midplane fiber optic assemblies 104. For example, the fiber optic connectors 200 (shown in FIG. 6) of the fiber optic assemblies 104 may be received in the connector channels 110. In one embodiment, the midplane connector 106 may be configured to retain thirty-two fiber optic connectors 200. The midplane connector 106 may be configured to retain any number of fiber optic connectors 200 in alternative embodiments. The fiber optic connectors 200 retain a plurality of the ferrules 216. The fiber optic connectors 200 orient the ferrules 216 substantially parallel to one another and present the ferrules 216 at the mating surface 108 of the midplane connector 106 for mating with corresponding ferrules 216 of the header assembly 103.

The midplane connector 106 includes a connector body 112 having opposite sides 114. Alignment features 116 are provided proximate to the sides 114 of the midplane connector 106, however the alignment features 116 may be provided at any suitable position. The alignment features 116 are used to orient the midplane connector 106 with respect to the header assembly 103. In the illustrated embodiment, the alignment features 116 are formed as pins. Alternatively, the midplane connector 106 may include any suitable alignment features 116, such as latches, fasteners, or the like. In an exemplary embodiment, the alignment features 116 are used for course alignment of the midplane connector 106 and the header assembly 103. Optionally, as the alignment features 116 engage the header assembly 103 during mating of the header assembly 103 with the midplane assembly 101, the midplane connector 106 may be forced to move or float in one or more directions to align the midplane connector 106 with the header assembly 103.

The first header assembly 103 includes a first header substrate 120, a first header connector 124 joined to the header substrate 120, and header fiber optic assemblies 122 held by the header connector 124. In one embodiment, the header substrate 120 may be a line card, switch card, or the like. The header substrate 120 is used to support the header connector 124 and to mate the header connector 124 to the corresponding midplane connector 106. Optionally, the header substrate 120 may be a circuit board, for example, a printed circuit board, a flex circuit, or the like. Electronic components may be mounted to the header substrate 120.

The header fiber optic assemblies 122 have fiber optic connectors 200 and ferrules 216 (both shown in FIG. 6) terminated to the ends of optical fibers of the header fiber optic assemblies 122. While the illustrated embodiment uses the same fiber optic connectors 200 and ferrules 216 for both the midplane fiber optic assemblies 104 and the header fiber optic assemblies 122, it is realized that the fiber optic connectors and ferrules may be different in alternative embodiments. The ferrules 216 are configured to be matched with corresponding ferrules 216 of the midplane connector 106. Fiber optic cables of the header fiber optic assemblies 122 extend along the header substrate 120 and may be terminated to another component, fiber optic connector or fiber optic cable connector.

The header connector 124 includes an attachment mechanism 126 that receives a pin, screw, or the like to secure the header connector 124 to the header substrate 120. In one embodiment, the header connector 124 may be adhered or otherwise attached to the header substrate 120. The header connector 124 includes a mating surface 127. In the illustrated embodiment, the mating surface 127 is oriented substantially perpendicular to a plane formed by the header substrate 120. Alternatively, the mating surface 127 may extend substantially parallel to the header substrate 120 or at any other suitable angle.

The header connector 124 includes connector channels 130 formed therein. The connector channels 130 are configured to receive a plurality of the header fiber optic assemblies 122. For example, the fiber optic connectors 200 (shown in FIG. 6) of the header fiber optic assemblies 122 may be received in the connector channels 130. The fiber optic connectors 200 orient the ferrules 216 substantially parallel to one another and present the ferrules 216 at the mating surface 127 of the header connector 124.

The header connector 124 includes a connector body 132 having opposite sides 134. Alignment features 136 are provided proximate to the sides 134 of the header connector 124. The alignment features 136 cooperate with the alignment features 116 to orient and/or secure the header connector 124 to the midplane connector 106. In the illustrated embodiment, the alignment features 136 are formed as apertures that are configured to receive the alignment features 116 of the midplane connector 106. Alternatively, the header connector 124 may include any suitable alignment features 136 that correspond to the alignment features 116 of the midplane connector 106.

The midplane connector 106 is configured to mate with the header connector 124 to connect the corresponding ferrules 216 to allow fiber optic transmissions therebetween. In the illustrated embodiment, the midplane substrate 102 is oriented perpendicular to the header substrate 120 and is mated in a mating direction that is perpendicular to the midplane substrate 102. Alternatively, the midplane substrate 102 and the header substrate 120 may be oriented parallel to one another or at any other suitable angle. During assembly, the alignment features 116 of the midplane connector 106 are inserted into the alignment features 136 of the header connector 124. The alignment features 116 guide the header connector 124 into alignment with the midplane connector 106. The pins of the alignment features 116 are relatively long to help align the header connector 124 and the midplane connector 106 prior to the fiber optic connectors 200 being mated. Such coarse alignment helps prevent damage to the fiber optic connectors 200 and/or the ferrules 216. As described in further detail below, the fiber optic connectors 200 have features that provide fine alignment once the fiber optic connectors 200 are closely positioned during mating. The alignment features 116 may be used as blind mating features to assist mating. When the alignment features 116 are received in the alignment features 136, the midplane connector 106 is able to float within the opening 166 of the midplane substrate 102 to align the mating surfaces 108 and 127. The midplane connector 106 and the header connector 124 axially align the ferrules 216 so that optical signal transmissions between the ferrules 216 of the midplane assembly 101 and the ferrules 216 of the header assembly 103 can occur with minimal interference or signal losses.

The midplane connector 106 and the header connector 124 are joined so that the mating surface 108 of the midplane connector 106 is aligned with and parallel to the mating surface 127 of the header connector 124. In one embodiment, the mating surface 108 abuts the mating surface 127. The midplane connector 106 is aligned with the header connector 124 so that the fiber optic connectors 200 of the midplane assembly 101 are aligned with corresponding fiber optic connectors 200 of the header assembly 103.

The second header assembly 105 may be identical to or substantially similar to the first header assembly 103. Alternatively, the second header assembly 105 may be different than the first header assembly 103. The second header assembly 105 has a second header substrate 304, a second header connector 306 joined to the header substrate 304, and header fiber optic assemblies 308 held by the header connector 306. In one embodiment, the header substrate 304 may be a line card, switch card, or the like. The header substrate 304 is used to support the header connector 306 and to mate the header connector 306 to a second midplane connector 302 of the midplane assembly 101. The second midplane connector 302 is joined to the midplane substrate 300 in a similar manner as the first midplane connector 106 is joined to the midplane substrate 102.

In the illustrated embodiment, the second midplane connector 302 is oriented orthogonal to the first midplane connector 106. For example, the second midplane connector 302 is oriented generally vertically while the first midplane connector 106 is oriented generally horizontally. The second header substrate 304 is likewise oriented vertically while the first header substrate 120 is oriented horizontally. Other configurations are possible in alternative embodiments, including both midplane connectors 106, 302 being oriented in the same direction (e.g. horizontally, vertically or otherwise).

In an exemplary embodiment, the midplane substrates 102, 300 may include multiple openings 166 for holding a plurality of midplane connectors 106, 302, which may be arranged in any number of rows and/or columns. Similarly, the header assemblies 103, 105 may include multiple header connectors 124, 306 (e.g. each header assembly 103, 105 may have a single substrate that holds multiple header connectors) for mating with the midplane connectors 106, 302. The midplane connectors 106, 302 each float with respect to the midplane substrates 102, 300 to align the corresponding midplane connectors 106, 302 and header connectors 124, 306.

Figure 2:
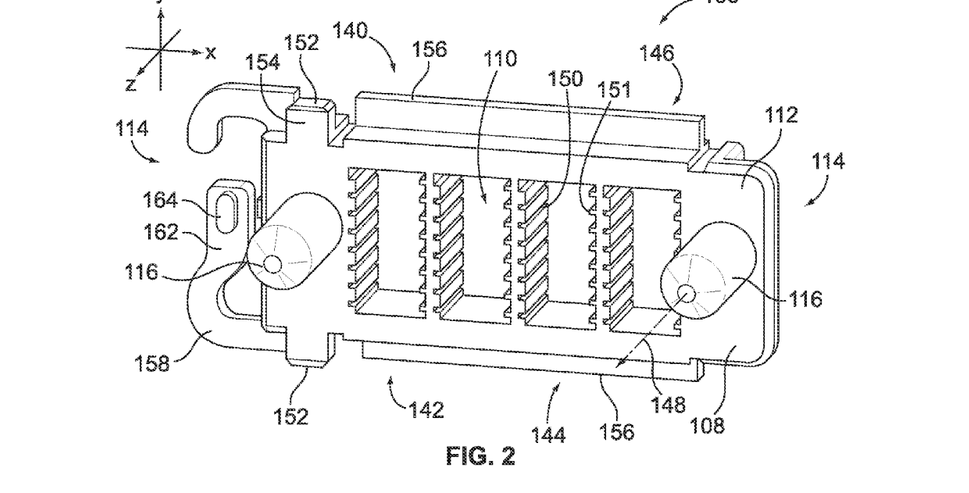
FIG. 2 is a front perspective view of a midplane connector formed in accordance with an embodiment.

FIG. 2 is a front perspective view of the midplane connector 106. In one embodiment, the midplane connector 106 is identical to the midplane connector 302 (shown in FIG. 1). The midplane connector 106 includes the connector body 112 having a top 140 and a bottom 142 extending between the sides 114. The midplane connector 106 includes a front 144 and a back 146. The mating surface 108 extends along the front 144 of the midplane connector 106.

The alignment features 116 are positioned proximate to the sides 114 of the midplane connector 106. The alignment features 116 extend from the front 144. An axis 148 of each alignment feature 116 is substantially perpendicular to the mating surface 108. The alignment features 116 may be formed from a deformable material. The alignment features 116 are tapered at the distal ends to locate the alignment features 116 within the alignment features 136 (shown in FIG. 1). When the alignment features 116 are inserted into the alignment features 136, the alignment features 116 may deform to create an interference fit with the alignment features 136.

The connector channels 110 extend from the front 144 to the back 146 of the midplane connector 106. In the illustrated embodiment, the midplane connector 106 includes four connector channels 110 extending therethrough. Alternatively, the midplane connector 106 may include any number of connector channels 110. Each connector channel 110 includes a plurality of slots 150 and a plurality of protrusions 151. Each slot 150 is aligned with a corresponding protrusion 151 on opposite sides of the connector channel 110. The slots 150 and protrusions 151 are configured to retain the fiber optic connectors 200 (shown in FIG. 6). In the illustrated embodiment, each connector channel 110 includes eight slots 150 and eight protrusions 151 configured to retain eight fiber optic connectors 200. In the illustrated embodiment, the four connector channels 110 are configured to retain a combined thirty-two fiber optic connectors 200. The midplane connector 106 may be configured with any number of connector channels 110 having any number of slots 150 and protrusions 151 to retain any suitable number of fiber optic connectors 200 in alternative embodiments. The slots 150 and protrusions 151 orient the fiber optic connectors 200 so that the ferrules 216 (shown in FIG. 6) are aligned with one another.

The front 144 of the midplane connector 106 includes front tabs 152 extending therefrom. The front tabs 152 extend outward from the top 140 and bottom 142 of the midplane connector 106 proximate to the front 144. The front tabs 152 include front surfaces 154 that are flush with the mating surface 108. In the illustrated embodiment, the front tabs 152 are positioned proximate to one side 114 of the midplane connector 106. Alternatively, the front tabs 152 may be positioned proximate to the other side 114 of the midplane connector 106 and/or at any intermediate position between the sides 114. During assembly, the front tabs 152 are configured to be passed through a corresponding opening 166 (shown in FIG. 3) in the midplane substrate 102 when mounted to the midplane substrate 102. For example, the opening 166 in the midplane substrate 102 that receives the midplane connector 106 may include notches 167 (shown in FIG. 3) that receive the front tabs 152.

The back 146 of the midplane connector 106 includes rear flanges 156 extending therefrom. The rear flanges 156 extend outward from the top 140 and bottom 142 of the midplane connector 106. The rear flanges 156 extend at least partially between the sides 114 of the midplane connector 106. The rear flanges 156 are oriented parallel to, and spaced rearward of, the front tabs 152. In one embodiment, the rear flanges 156 may be formed as tabs positioned between the sides 114 of the midplane connector 106. The flanges 156 and the tabs 152 are configured to retain the midplane connector 106 within the midplane substrate 102 as described below.

In an exemplary embodiment, a gap 160 is defined between the rear flanges 156 and the front tabs 152. When the midplane connector 106 is mounted to the midplane substrate 102, the midplane substrate 102 is positioned in the gap 160. The gap 160 has a thickness that is approximately equal to the thickness of the midplane substrate 102. The midplane substrate 102 is captured between the rear flanges 156 and front tabs 152. Optionally, the rear surfaces of the front tabs 152 may engage one side of the midplane substrate 102 while the front surfaces of the rear flanges 156 may engage the other side of the midplane substrate 102. In an exemplary embodiment, the midplane substrate 102 is allowed to move (e.g. side-to-side and/or up-and-down) within the gap 160 to allow the midplane connector 106 to float on the midplane substrate 102. The midplane connector 106 may be enabled to float in at least one of the x, y, and z directions.

A lock 158 extends from one of the sides 114 of the midplane connector 106. Optionally, the lock 158 may extend from the side 114 of the midplane connector 106 proximate to the front tabs 152. The lock 158 is configured to engage the midplane substrate 102 to secure the midplane connector 106 to the midplane substrate 102. Optionally, the lock 158 may engage the midplane substrate 102 while still allowing the midplane connector 106 to float or move with respect to the midplane substrate 102. In the illustrated embodiment, the lock 158 includes a spring arm 162 that is flexible and allows movement of the midplane connector 106 with respect to the midplane substrate 102. The lock 158 allows the midplane connector 106 to float in the x, y, and/or z directions with respect to the midplane substrate 102. The lock 158 includes a locking pin 164 extending forward from the spring arm 162.

Figure 3:
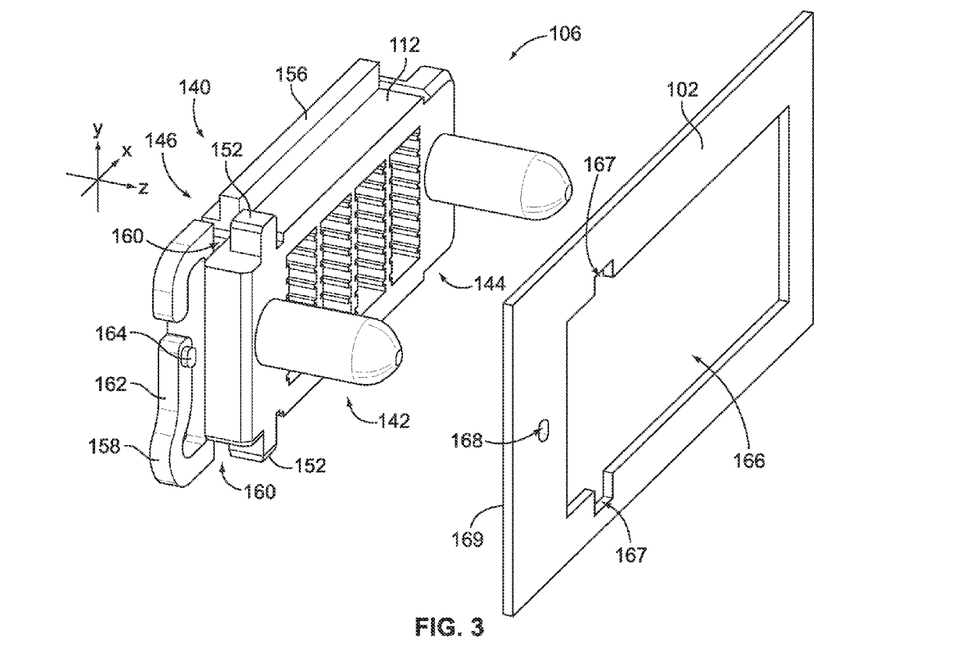
FIG. 3 is a side perspective view of the midplane connector shown in FIG. 2 poised for mounting to a midplane substrate.

FIG. 3 is a side perspective view of the midplane connector 106 poised for assembly with the midplane substrate 102. The gaps 160 are shown between the front tabs 152 and the rear flanges 156 on both the top 140 and the bottom 142 of the midplane connector 106. When assembled, the midplane substrate 102 is positioned in the gaps 160 between the front tabs 152 and the rear flanges 156.

The midplane connector 106 is configured to be inserted into an opening 166 in the midplane substrate 102 in a loading direction, shown by the arrow A. The midplane connector 106 is loaded from behind the midplane substrate 106 by loading the front 144 of the connector body 112 through the opening 166. The front tabs 152 are aligned with and loaded through the notches 167 of the opening 166 in the midplane substrate 106. The connector body 112 is loaded into the opening 166 until the rear flanges 156 engage a back side 169 of the midplane substrate 102. In an exemplary embodiment, after loading through the opening 166, the midplane connector 106 is shifted laterally, such as in the direction of arrow B, until the front tabs 152 are not aligned with the notches 167, but instead are aligned with the midplane substrate 102 adjacent the notches 167. Optionally, the front tabs 152 and/or the rear flanges 156 may be deformable to allow the midplane connector 106 to be snapped into the opening 166 of the midplane substrate 102. The lock 158 is secured to the midplane substrate 102 by loading the locking pin 164 in a locking opening 168 of the midplane substrate 102 to secure the distal end of the spring arm 162 with respect to the midplane substrate 102.

The midplane connector 106 is sized relative to the opening 166 to enable the midplane connector 106 to float within the opening 166. For example, the opening 166 may be slightly taller and slightly wider than the midplane connector 106 to allow floating in the x or y directions. The gap 160 may be slightly wider than the midplane substrate 102 to allow floating in the z direction. The midplane connector 106 floats within the midplane substrate 102 such that the edges of the midplane substrate 102 slide between the front tabs 152 and the rear flanges 156 of the midplane connector 106. When positioned within the midplane substrate 102, the back 146 of the midplane connector 106 is accessible from the rear side of the midplane substrate 102. The front 144 of the midplane connector 106 is accessible from the front side of the midplane substrate 102.

Figure 4:
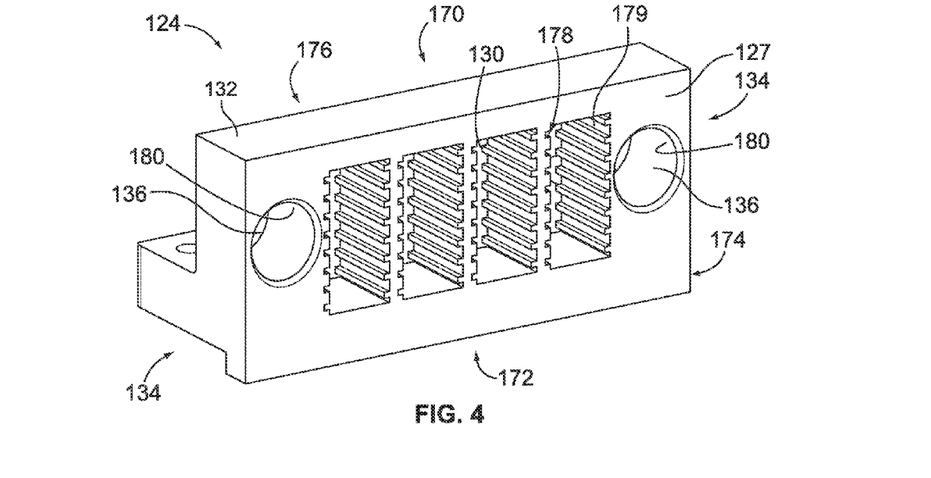
FIG. 4 is a front perspective view of a header connector formed in accordance with an embodiment.

FIG. 4 is a front perspective view of the header connector 124. In one embodiment, the header connector 124 is identical to the header connector 306 (shown in FIG. 1). The header connector 124 includes the connector body 132 having a top 170 and a bottom 172 extending between the sides 134. The header connector 124 includes a front 174 and a back 176. The mating surface 127 extends along the front 174 of the header connector 124.

The connector channels 130 extend from the front 174 to the back 176 of the header connector 124. In the illustrated embodiment, the header connector 124 includes four connector channels 130. Optionally, the header connector 124 may include any suitable number of connector channels 130. The number of connector channels 130 in the header connector 124 corresponds to the number of connector channels 110 in the midplane connector 106. Each connector channel 130 includes a plurality of slots 178 and a plurality of protrusions 179. Each slot 178 is aligned with a corresponding protrusion 179. The slots 178 and protrusions 179 are configured to retain the fiber optic connectors 200 (shown in FIG. 6). The fiber optic connectors 200 are retained between aligned pairs of slots 178 and protrusions 179. In the illustrated embodiment, each connector channel 130 includes eight slots 178 and eight protrusions 179 configured to retain eight fiber optic connectors 200. In the illustrated embodiment, the four connector channels 130 are configured to retain a combined thirty-two fiber optic connectors 200. In one embodiment, the header connector 124 may be configured with any number of connector channels 130 having any number of slots 178 and protrusions 179 to retain any suitable number of fiber optic connectors 200.

The alignment features 136 are positioned proximate to the sides 134 of the header connector 124. The alignment features 136 are formed as apertures extending from the front 174 to the back 176 of the header connector 124. The alignment features 136 are configured to receive the alignment features 116 (shown in FIG. 2) of the midplane connector 106. The alignment features 136 include an inner surface 180. Optionally, the alignment features 116 may engage the inner surface 180 in an interference fit to hold the header connector 124 and the midplane connector 106 together. The alignment features 136, 116 may be tapered to more easily align the header connector 124 and the midplane connector 106.

Figure 5:
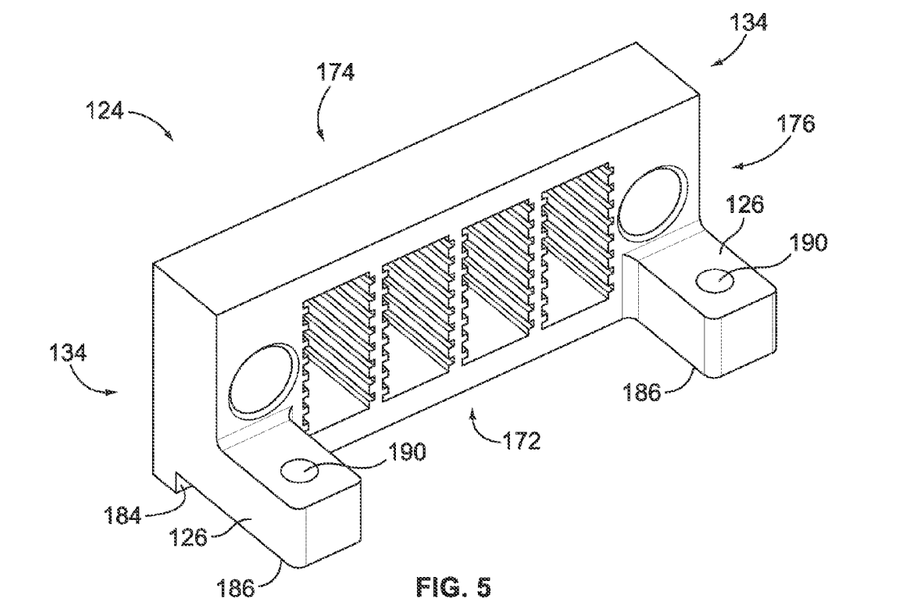
FIG. 5 is a back perspective view of the header connector shown in FIG. 4.

FIG. 5 is a back perspective view of the header connector 124. The attachment mechanisms 126 extend from the back 176 of the header connector 124 and are used to attach the header connector 124 to the header substrate 120. The attachment mechanisms 126 are positioned proximate to the sides 134 of the header connector 124. Optionally, the attachment mechanisms 126 may be positioned at any intermediate location between the sides 134 of the header connector 124. The attachment mechanisms 126 extend proximate to the bottom 172 of the header connector 124.

The front 174 of the header connector 124 includes a lip 184 extending from the bottom 172 of the header connector 124. The attachment mechanisms 126 include a bottom surface 186. The bottom surface 186 is stepped up from the lip 184. The header connector 124 is configured to be positioned on the header substrate 120 (shown in FIG. 1) so that the bottom surfaces 186 of the attachment mechanisms 126 abut a surface of the header substrate 120. The lip 184 is configured to abut an edge of the header substrate 120 so that the front 174 of the header connector 124 extends from the header substrate 120.

The attachment mechanisms 126 include apertures 190 extending therethrough. The apertures 190 are configured to receive a screw, pin, or the like therethrough. The header connector 124 is configured to be positioned on the header substrate 120 so that the apertures 190 align with corresponding apertures formed in the header substrate 120. The screw, pin, or the like is inserted through the apertures 190 and into the corresponding apertures of the header substrate 120. The screw, pin, or the like secures the header connector 124 to the header substrate 120. In other embodiments, the attachment mechanisms 126 may be formed as latches configured to engage corresponding mechanisms on the header substrate 120. Alternatively, the header connector 124 may be adhered or otherwise secured to the header substrate 120.

Figure 6:
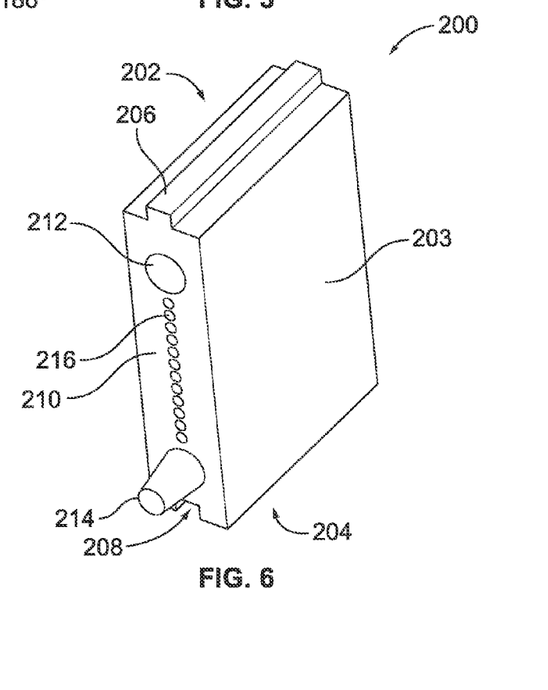
FIG. 6 is a front perspective view of a fiber optic connector formed in accordance with an embodiment.

FIG. 6 is a front perspective view of one of the fiber optic connectors 200 formed in accordance with an embodiment. The fiber optic connector 200 is configured for use with the midplane connectors 106 and 302 and/or the header connectors 124 and 306 (all shown in FIG. 1). The fiber optic connector 200 is configured to be inserted into a connector channel 110 of a midplane connector 106, 302 or a connector channel 130 of a header connector 124, 306.

The fiber optic connector 200 includes a ferrule housing 203 extending between a first side 202 and a second side 204. The first side 202 includes a protrusion 206 extending therefrom. The second side 204 includes slot 208 formed therein. The protrusion 206 is configured to be inserted into the slot 150 (shown in FIG. 2) of the midplane connector 106 or the slot 178 (shown in FIG. 4) of the header connector 124. Optionally, an interference fit may be created between the protrusion 206 and the corresponding slot 150 or 178. The protrusion 206 is used to position and align the fiber optic connector 200 with respect to the midplane connector 106 or the header connector 124. The slot 208 is configured to receive a protrusion 151 (shown in FIG. 2) of the midplane connector 106 or a protrusion 179 (shown in FIG. 4) the header connector 124. Optionally, an interference fit may be created between the slot 208 and the corresponding protrusion 151 or 179. The slot 208 is used to position and align the fiber optic connector 200 with respect to the midplane connector 106 or the header connector 124.

The ferrule housing 203 includes a front face 210. A ferrule housing 203 inserted into the midplane connector 106 is configured to align with a corresponding ferrule housing 203 inserted into the header connector 124. The front faces 210 of corresponding ferrule housings 203 are configured to be aligned when the midplane connector 106 is coupled to the header connector 124. In one embodiment, the front faces 210 of corresponding ferrule housings 203 are configured to abut one another.

In an exemplary embodiment, the fiber optic connector 200 includes locating features 212, 214 that are used to position the ferrule housing 203 in precise alignment with the corresponding ferrule housing 203 to which such ferrule housing 203 is mated. The locating features 212, 214 are fine alignment features that make fine adjustments to properly position the ferrule housings 203. For example, while the alignment features 116, 136 (both shown in FIG. 1) provide course alignment of the midplane connector 106 and header connector 124, the locating features 212, 214 provide fine alignment between the ferrule housings 203 to align the ferrules 216. Optionally, the locating features 212, 214 may be tapered to more easily align the locating features 212, 214 during mating. In the illustrated embodiment, the ferrule housing 203 includes an aperture proximate to the first side 202 that defines the first locating feature 212 and a post proximate to the second side 204 that defines the second locating feature 214. The post is sized to be inserted into an aperture of another ferrule housing 203. When the midplane connector 106 is coupled to the header connector 124, the posts are aligned with the apertures of the corresponding ferrule housings 203. Optionally, the posts and apertures are tapered to help with locating the ferrule housings 203. An interference fit may be created when the ferrule housings 203 are mated.

The ferrule housing 203 holds a plurality of ferrules 216 that are provided at ends of individual optical fibers. The ferrules 216 are provided at the front face 210 of the ferrule housing 203. The ferrules 216 include front faces. The front face of each ferrule 216 is positioned substantially flush with the front face 210 of the ferrule housing 203. The ferrules 216 are aligned with one another in a row between the first side 202 and the second side 204 of the ferrule housing 200. Alternatively, the ferrules 216 may be offset from one another, such as along two or more rows. The ferrules 216 are equally spaced across the front face 210 of the ferrule housing 200. In another embodiment, the ferrules 216 may have any suitable spacing. The ferrules 216 are configured to transmit and receive optical signals.

In the illustrated embodiment, the ferrule housing 203 includes twelve ferrules positioned therein. Accordingly, a midplane connector 106 or header connector 124 configured to receive thirty-two ferrule housings is capable of carrying three hundred and eighty four optical fibers. Other configurations and numbers of optical fibers are possible in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A photonic assembly for optical fibers comprising:
a midplane connector having a connector body including a connector channel extending therethrough, the midplane connector including a lock extending from the connector body, the lock including a flexible spring arm;
fiber optic connectors positioned within the connector channel of the midplane connector, the fiber optic connectors retaining ferrules of midplane optical fibers and aligning the ferrules of the midplane optical fibers within the midplane connector; and
a midplane substrate having an opening extending therethrough, the midplane connector positioned within the opening of the midplane substrate and the lock engaging the midplane substrate to secure the midplane connector to the midplane substrate, the flexible spring arm allowing the midplane connector to float within the opening of the midplane substrate to position the ferrules of the midplane optical fibers.

2. The photonic assembly of claim 1, wherein the spring arm of the lock is formed integral with the connector body as a unitary one-piece structure and is cantilevered from the connector body.

3. The photonic assembly of claim 1, wherein the midplane connector includes an alignment feature to secure the midplane connector to a corresponding header connector.

4. The photonic assembly of claim 1, wherein the midplane connector is a first midplane connector, the photonic assembly further comprising a second midplane connector, the midplane optical fibers configured to couple the first midplane connector and the second midplane connector.

5. The photonic assembly of claim 1, wherein the midplane connector floats within the midplane substrate in at least one of the x, y, or z direction.

6. The photonic assembly of claim 1, wherein the connector channel of the midplane connector includes slots and protrusions, the fiber optic connectors including complementary slots and protrusions that mate with the slots and protrusions of the midplane connector to retain the fiber optic connectors in the connector channel.

7. The photonic assembly of claim 1, wherein the midplane connector includes a rear flange and a front tab with a gap defined therebetween, the midplane substrate being received in the gap and captured between the rear flange and the front tab.

8. The photonic assembly of claim 1, wherein the midplane connector floats within the midplane substrate to align the midplane connector with a corresponding header connector.

9. A photonic assembly for optical fibers comprising:
a midplane connector coupled to a midplane substrate, the midplane connector having a connector channel formed therein to receive midplane fiber optic connectors, the midplane connector having a connector body with a front and guide pins defining alignment features extending from the front; and
a header connector coupled to a header substrate, the header connector having a connector channel formed therein to receive header fiber optic connectors, the header connector including bores defining alignment features of the header connector, the header connector coupled to the midplane connector to couple the midplane fiber optic connectors and the header fiber optic connectors, the guide pins being received in the bores to align the header connector with the midplane connector during mating, the midplane connector floating with respect to the midplane substrate to align the midplane connector and the header connector.

10. The photonic assembly of claim 9, wherein the midplane connector includes a lock to secure the midplane connector to the midplane substrate, the lock being flexible to enable the midplane connector to float with respect to the midplane substrate.

11. The photonic assembly of claim 9, wherein the midplane connector floats with respect to the midplane substrate to align the midplane fiber optic connectors with the header fiber optic connectors.

12. The photonic assembly of claim 9, wherein the midplane connector includes a lock extending from the connector body, the lock including a flexible spring arm that allows the midplane connector to float relative to the midplane substrate to locate the midplane connector with respect to the header connector.

13. The photonic assembly of claim 9, wherein the alignment feature provides course alignment of the midplane fiber optic connectors with respect to the header fiber optic connectors, and wherein the midplane fiber optic connectors include locating features for fine alignment of the midplane fiber optic connectors with respect to the header fiber optic connectors.

14. The photonic assembly of claim 9, wherein the connector channel of the midplane connector includes slots and protrusions, the midplane fiber optic connectors including complementary slots and protrusions that mate with corresponding slots and protrusions of the midplane connector to retain the midplane fiber optic connectors in the connector channel of the midplane connector.

15. A photonic assembly comprising:
a midplane assembly having a first midplane substrate and a second midplane substrate parallel and spaced apart from the first midplane substrate;
a first midplane connector coupled to the first midplane substrate so that the first midplane connector faces in a first direction for mating with a first header connector;
a second midplane connector coupled to the second midplane substrate so that the second midplane connector faces in a second direction opposite the first direction for mating with a second header connector; and
a plurality of midplane optical fiber assemblies, each fiber optic assembly having a first fiber optic connector terminated to a first end of a fiber optic cable and a second fiber optic connector terminated to a second end of a fiber optic cable, the fiber optic cable spanning between the first and second midplane substrates.

16. The photonic assembly of claim 15, wherein the first midplane connector floats with respect to the first midplane substrate to align the first midplane connector with the first header connector, and wherein the second midplane connector floats with respect to the second midplane substrate independently of the first midplane connector to align the second midplane connector with the second header connector.

17. The photonic assembly of claim 15, wherein the midplane connector includes a lock to secure the midplane connector to the midplane substrate, the lock being flexible to enable the midplane connector to float with respect to the midplane substrate.

18. The photonic assembly of claim 15, wherein the second midplane connector is oriented at an orthogonal position with respect to the first midplane connector, the fiber optic cables being twisted between the first and second midplane connectors.

19. The photonic assembly of claim 15 further comprising:
a first header assembly having a first header substrate and a first header connector mounted to the first header substrate; and
a second header assembly having a second header substrate and a second header connector mounted to the second header substrate, wherein the first header substrate is oriented perpendicular with respect to the second header substrate.

20. The photonic assembly of claim 15 further comprising:
multiple midplane connectors coupled to the first midplane substrate; and
a first header assembly with multiple header connectors joined to a first header substrate, the header connectors of the first header assembly being simultaneously mated to the midplane connectors coupled to the first midplane substrate, wherein the midplane connectors coupled to the first midplane substrate float with respect to the first midplane substrate to align with the corresponding header connectors.

* * * * *